3,536,445
METHOD OF PREPARING ZINC HYDROSULFITE
Virgil L. Hansley and Stuart Schott, Cincinnati, Ohio, and Louis F. Moormeier, Fairfield, Conn., assignors to National Distillers and Chemical Corporation, New York, N.Y., a corporation of Virginia
No Drawing. Filed Oct. 8, 1965, Ser. No. 494,243
The portion of the term of the patent subsequent to Sept. 7, 1982, has been disclaimed
Int. Cl. C01b 17/66
U.S. Cl. 23—116                                                                 8 Claims

ABSTRACT OF THE DISCLOSURE

An improved method for the preparation of stable zinc hydrosulfite solutions wherein reactive zinc is reacted with sulfur dioxide in an aqueous solution, the improvement being utilizing reactive zinc in the form of a sodium-zinc alloy having a particle size of from about 1 to about 25 microns and a sodium content of about 0.5 to 4.0 weight percent. The temperature of reaction is between about 5° and 60° C.

---

This invention relates to novel zinc compositions and their preparation. More particularly, it relates to a sodium-zinc alloy having a small particle size, its uses, and its preparation.

The sodium-zinc alloys of this invention may be used generally in place of commercial zinc dust when the reaction calls for the use of zinc in a reactive form. It is especially useful in the preparation of stable zinc hydrosulfite solutions, which are important industrially as bleaching agents for ground-wood, paper and pulp, and other cellulosic materials.

At the present time, zinc dust having a particle size of about 200 to 325 mesh, is used commercially when the reaction calls for the use of reactive zinc particles. The use of zinc dust, however, has several disadvantages. In the first place, zinc dust, obtained commercially by distilling virgin or byproduct zinc, is relatively expensive. In addition, fire and explosion hazards are involved in the handling and reaction of zinc dusts. The use of zinc dust also requires a special reaction zone that can handle such finely divided material.

It is also known that zinc hydrosulfite may be prepared by the reaction of sulfur dioxide with zinc amalgam in an aqueous medium and in the absence of alkali salts. The use of an amalgam has the disadvantage of requiring the handling of large amounts of mercury which must also be recovered for economic and safety reasons.

U.S. Pat. No. 3,205,038 shows that the disadvantages involved in the use of a zinc dust or zinc amalgam can be overcome by the use of a solid sodium-zinc alloy having a particle size of about ½ inch up to about 2 inches and a sodium content within the range of about 0.5 to 4.0 weight percent. Although the invention of said application overcame the disadvantages of the prior art and has broad commercial application, it could not be used effectively to prepare concentrated solutions of zinc hydrosulfite. Zinc hydrosulfite solutions of 20–30% concentration must be prepared for conversion to sodium hydrosulfite where crystalline processes are involved. The present invention, while overcoming the disadvantages of the prior art has the further advantage in that it can be employed to prepare stable zinc hydrosulfite solutions of relatively high concentrations. It is, of course, essential that stable solutions be obtained since the commercial applicability of zinc hydrosulfite solutions is predicted, in great part, on their stability.

It has also been found that the stable zinc hydrosulfite solutions of this invention can be converted by methods well-known to the art, to higher yields of sodium hydrosulfite. In addition, the sodium hydrosulfite which is obtained has a high degree of purity.

It is, therefore, an object of this invention to provide a sodium-zinc alloy which can be utilized to prepare stable, concentrated solutions of zinc hydrosulfite.

Another object of this invention is to provide a reactive form of zinc which eliminates the hazards involved in employing zinc dust or zinc amalgam as a reactant.

A further object of this invention is to provide a method for producing stable zinc hydrosulfite solutions by reacting sulfur dioxide under conventional operating conditions with a sodium-zinc alloy admixed with a liquid hydrocarbon.

It is still a further object of this invention to provide high conversions of zinc hydrosulfite to sodium hydrosulfite which has a high stability.

Other objects will become readily apparent from the ensuing description and illustrative embodiments of the invention.

It has now been found, in accordance with this invention, that more stable zinc hydrosulfite solutions can be prepared by reacting, in an aqueous solution, sulfur dioxide with a sodium zinc alloy, the alloy having a particle size in the range of from about 1 micron to about 50 microns, preferably from about 1 to 25 microns, at a temperature between about 5° and 60° C., preferably between about 20° and 40° C. The pH is usually maintained between about 3 and 8.

The sodium-zinc alloy can be made by any convenient method. Most commonly, it is prepared by melting together sodium and zinc metal, for example, ingot zinc, galvanizers, zinc dross, diecasters zinc waste. The resulting sodium-zinc alloy is usually cast into an ingot which is then cooled. The cooled casting is then comminuted to the desired particle size by conventional techniques.

The amount of sodium in the sodium-zinc alloy may vary widely, but in general a sodium content of about 0.5 to about 4.0 weight percent is satisfactory, and a sodium content of about 1 to 3.5% is preferred. An alloy containing up to about 4% sodium is sufficiently brittle to permit easy grinding, while a sodium content higher than about 40% results in a product which contains a malleable free sodium phase, and because of this, it can be ground only with difficulty. Also, an alloy composition having a sodium content higher than about 4% tends to react with oxygen and moisture in the air, resulting in an alkaline and moist material when in contact with moist air.

In accordance with the preferred method of this invention, the preparation of zinc hydrosulfite is carried out in the presence of an inert diluent or diluents to form an easily transported zinc-rich paste dispersion. Such materials, if used, should be inert both to the reactants and the products. An example of suitable diluents include liquid hydrocarbons having from 6 to 16 carbon atoms per molecule. The use of petroleum hydrocarbon fractions having from 10 to 12 carbons has been found to be particularly effective for this purpose. Mixtures of the various liquid hydrocarbons can, of course, also be utilized. Generally, the liquid hydrocarbons which are used have a boiling point of from 160° to 250° C., preferably from about 190° to 220° C. Some specific examples of the liquid hydrocarbons which may be employed are kerosene, naphtha, alkylate, ligroin, mineral spirits, tetralin, decalin, high flash point gasoline and the like. The amount of diluent employed is not critical and may vary over a wide range. In general, however, the volume ratio of diluent to the zinc will range from about 0.5:1 to 8:1 and preferably about 1:1.

In accordance with another important feature of this invention, the sodium-zinc alloy paste can be admixed with a liquid hydrocarbon, such as those disclosed above, and added in the form of a suspension or hydrocarbon-damp powder to the reaction zone. The aforementioned admixture can be conveniently prepared by adding more of the liquid hydrocarbon during the comminution of the alloy. The alloy will generally settle quite rapidly in the absence of agitation and can be separated as a hydrocarbon-damp powder or paste, if desired. This dispersion may be stabilized against alloy separation by the addition of a surface-active agent such as aluminum stearate, zinc stearate, sodium stearate, various metal soaps, and the like. It has also been found that the addition of a surface-active agent in the amount of from about 1 to 8% based on the liquid hydrocarbon present will provide on shaking a stable gel structure in which the particles will remain suspended for long periods of time.

The preparation of zinc hydrosulfite may be effected in any suitable conventional reaction vessel adapted for carrying out such a reaction, such as static beds or slowly agitated beds, for example, a rotation drum reactor, and under conventional operative conditions.

The zinc hydrosulfite produced in accordance with this invention can be converted into sodium hydrosulfite by any convenient procedure. Most commonly, it is reacted with sodium hydroxide or sodium carbonate at about 0° to about 65° C. A desirable method of converting and recovering sodium hydrosulfite comprises circulating the sodium-zinc alloy in water with liquid $SO_2$ through a tubular cooler at 35° C. The zinc hydrosulfite, after filtration, is converted to sodium hydrosulfite with 25% caustic soda. Zinc hydroxide is filtered from the sodium hydrosulfite solution. The dihydrate of sodium hydrosulfite ($Na_2S_2O_4 \cdot 2H_2O$) is "salted" out with sodium chloride and alcohol. One-third to one-half of the mother liquor is decanted off and the remaining slurry is heated to 60° C., to dehydrate the sodium hydrosulfite solids. The resulting crystals are separated by filtration, washed with alcohol and dried at 60° to 80° C., under vacuum. Commercially, the final overall yield is 64–72% based on $SO_2$.

This invention will be more fully understood by reference to the following illustrative embodiments.

EXAMPLE I

A ten-pound charge of minus 16 mesh sodium-zinc alloy chips carrying 1.8% free sodium was placed in a standard steel ball mill 12 in. in diameter and 9 in. high. The ball charge was 42 lbs. of graded steel balls from ¼ to 1¼. The ball charge plus NaZn chips were covered with synthetic petroleum alkylate, B.P. 160°–190° C. Except for the absence of high boilers, this alkylate may be considered as a saturated standard kerosene. This charge was "ground" at 20–40 r.p.m. for 48 hours. Upon discharging from the mill and separating the steel grinding balls, the suspension of zinc powder was 1–10 microns particle size. A gas evolution analysis with dilute HCl showed the

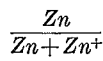

ratio to be 0.98 which means that the free metal values were preserved during grinding. Because of the great difference in density even this finely ground zinc settles rapidly and can be separated as a hydrocarbon-damp powder containing 88% zinc-sodium alloy and 12% hydrogen carbon by weight.

To stabilize this damp powder against further separation of an oily layer on long standing, it was discovered that the addition of as little as 6% of aluminium stearate, based on the 12 parts of hydrocarbon present, followed by shaking on a standard paint shaker for a few minutes caused a stable gel structure to form in which the zinc particles would remain suspended. The effect of forming the gel had a profound effect on the zinc suspension. What was previously a damp powder which seemed to have no continuous phase now was a true paste with continuous gel between the zinc particles. This paste handled with a putty knife much like thinned putty.

The sodium-zinc alloy dispersion provides a number of advantages:

(a) The oil protects the powder from attack of air and moisture in storage, making it possible to easily obtain zinc metal values higher than in zinc dust;

(b) The product is not dusty, and it cannot be mixed with air to form a metal dust explosion. In fact, the tendency to ignite, which is common to all finely divided dry metals, is eliminated.

The following examples show that the presence of a liquid hydrocarbon in the reduction of sulfur dioxide to hydrosulfite gives higher yields based on both zinc and sulfur dioxide.

EXAMPLE II

To a 2-liter reaction kettle, fitted with a stainless steel Cowles dissolver blade, thermometer, pH electrode, a liquid $SO_2$ feed and a nitrogen inlet were charged 1200 ml. air-free water and 165 g. (25% excess) of sodium-zinc (1–25 microns, average particle size 6–7 microns) alloy containing 1.97% free sodium. The zinc content by hydrogen evolution was 97.2%. Over 58 minutes, 266 g. of liquid $SO_2$ were charged to the NaZn alloy water slurry maintaining the temperature between 26–28° C. The initial pH was 5.5 and gradually dropped to 4.1 when the reaction was completed. The yield of $ZnS_2O_4$ was 86.4% based on the $SO_2$.

EXAMPLE III

In another run utilizing the apparatus of Example II, 165 g. (dry basis) of the same sodium-zinc alloy was charged to the kettle containing 165 g. of odorless mineral spirits and 1200 ml. of air-free water. During 58 minutes, minutes, 265 g. of liquid $SO_2$ was fed to the NaZn alloy slurry, while maintaining the temperature at 27–30° C. The pH was observed to change from 5.6 to 5.0 during the $SO_2$ feed. The yield of $ZnS_2O_4$ was 89%.

EXAMPLE IV

To the apparatus of Example II were charged 1200 ml. of air-free water and 145 g. of odorless mineral spirits. To this was added 185 g. (dry basis) of NaZn alloy paste. The composition of this paste was 88% NaZn powder, (1–30 microns, average particle size 4–5 microns), 1% aluminum stearate and 11% odorless mineral spirits and was prepared as described in Example I. The iron in the alloy measured 0.92% and the sodium level was 1.87%. The zinc content by hydrogen evolution was 98.2%. In 57 minutes, 272 g. of liquid $SO_2$ was added to the NaZn slurry at a temperature of 29–33° C. The pH range was 6.5 to 4.9. A yield of 87.1% resulted. Upon conversion to $Na_2S_2O_4$ very large clear crystals resulted, free from the usual fine sodium hydrosulfite dust that is normally encountered.

It will be evident from a comparison of Examples V and VI that a higher yield and more pure sodium hydrosulfite is obtained by reacting the reactants in the presence of a liquid hydrocarbon diluent with the sodium-zinc alloy having the particle size of this invention rather than that of the prior art.

EXAMPLE V

To the apparatus of Example II were charged 1200 ml. of air-free water, 165 g. odorless mineral spirits and 165 g. (25% excess) of NaZn alloy paste (particle size 1–25 micron, average 6 micron) containing 1.97% sodium. The percent of active zinc by hydrogen evolution was 97.2%. Reaction during a 55-minute addition of 260 g. of liquid $SO_2$ resulted in an 86.6% yield of $ZnS_2O_4$. The pH range was 5.5 to 4.5 and the temperature was maintained at 25–28° C. After filtration, to remove unreacted alloy, the 20.1% solution of $ZnS_2O_4$ was sodiated with $Na_2CO_3$ (50% excess) by the use of the conventional reaction procedure. It was found advantageous to maintain a favorable pH of 8–9 by adding 10–30 ml. of 25% NaOH. After filtering off the ZnCO$_3$, an 84.9% conversion to Na$_2$S$_2$O$_4$ was noted. Salting out and dehydration was conducted quite easily in the manner well known in the art. The purity of the isolated Na$_2$S$_2$O$_4$ was 93.1%.

EXAMPLE VI

In another run, 165 g. of commercial zinc dust (particle size of 200 to 325 mesh, average 300 mesh), 165 g. of odorless mineral spirits and 1200 ml. of air-free water were reacted for 57 minutes with 260 g. of liquid SO$_2$ in the same manner as Example V. A yield of 93.6% ZnS$_2$O$_4$ resulted. After filtering off the unreacted zinc dust, the 21.0% solution of ZnS$_2$O$_4$ was sodiated in the same manner as Example V, but only a 66% conversion to Na$_2$S$_2$O$_4$ was obtained. Salting out and dehydration was accomplished as in Example V, but it was more difficult to dry the resulting Na$_2$S$_2$O$_4$ crystals. The purity of the dry material was only 85.2%. A comparison of the runs of Examples VII and VIII will show that more stable zinc hydrosulfite solutions are achieved by preparing the zinc hydrosulfite in accordance with this invention.

EXAMPLE VII (A) To a conventional reaction vessel were charged 260 g. alkylate wet NaZn alloy (72.8% NaZn powder-27.2% alkylate) containing 1.78% sodium. Also included were 118 g. alkylate and 343 g. of air-free water. Over 53 minutes, 296 g. SO$_2$ in 600 ml. of air-free water were added to the reaction vessel while maintaining the temperature between 14° and 26° C. The pH changed from 5.2 to 4.8 during the addition. The final yield of ZnS$_2$O$_4$ (based on SO$_2$) was 90%. After filtration to remove the unreacted alloy, the concentration of the ZnS$_2$O$_4$ solution was measured at 28.9%. Daily room temperature stability studies indicate there is less tendency for this ZnS$_2$O$_4$ solution to immediately decompose as compared to similar solutions prepared with commercial zinc dust.

(B) In a similar run, 263 g. of the same alkylate wet NaZn alloy was charged with 121 g. of alkylate and 470 g. air-free water. Reaction with 300 g. SO$_2$ in 587 g. air-free water over 67 minutes produced a 92.7% yield of ZnS$_2$O$_4$. Results similar to that indicated above in (A) were obtained after conducting daily room temperature stability studies.

(C) Another run, performed as in A and B above, except the alkylate was removed from NaZn powder by vacuum and this dry NaZn alloy was charged to 508 g. of air-free water. Reaction over 65 minutes with 318 g. SO$_2$ in 612 g. of air-free water gave an 80.2% yield of ZnS$_2$O$_4$, which also exhibited high stability.

EXAMPLE VIII (A) To a conventional reaction vessel were charged 183 g. commercial zinc dust (particle size 200 to 325 mesh, average 300 mesh) together with 183 g. alkylate and 407 g. of air-free water. In 52 minutes 286 g. of SO$_2$ in 600 g. of air-free water had completely reacted with the zinc. A temperature of 9°–16° C. was maintained with a resultant pH range of 5.9 to 5.2. A yield of 98.8% ZnS$_2$O$_4$ was obtained. Filtration, to remove unreacted zinc dust and subsequent daily stability studies indicate that the activity of this material though higher at the outset drops quite rapidly as compared to alloy preparations.

(B) In another run, 210 g. commercial zinc dust (particle size 200 to 325 mesh, average 300 mesh) and 596 g. air-free water were charged together and reacted with 330 g. SO$_2$ in 600 g. air-free water over 61 minutes. The pH changed from 5.4 to 3.5 and a yield of 93.7% was obtained. The stability curve again showed a relatively faster drop-off in ZnS$_2$O$_4$ activity with time.

(C) In a third run, 172.5 g. commercial zinc dust (particle size 200 to 325 mesh, average 300 mesh) in 359 g. air-free water, reacted with 270 g. SO$_2$ in 593 g. air-free water in 73 minutes. The pH range was 5.0 to 4.1 resulting in a yield of 93.7%. The stability test on this solution showed that activity was almost completely gone in 5 days.

The above data show that stable zinc hydrosulfite solutions of relatively high concentrations can be effectively prepared utilizing the sodium-zinc alloys of this invention. The data further show that higher yields and more pure sodium hydrosulfate can be obtained when the zinc hydrosulfite is prepared from the present sodium-zinc alloys and pastes thereof.

While particular embodiments of this invention are shown above, it will be understood that the invention is obviously subject to variations and modifications without departing from its broader aspects.

What is claimed is:

1. In a method for the preparation of stable zinc hydrosulfite solutions which comprises reacting reactive zinc with sulfur dioxide in an aqueous solution at a temperature between about 5° and 60° C., the improvement which comprises using reactive zinc in the form of a sodium-zinc alloy having a particle size from about 1 to 25 microns and a sodium content of about 0.5 to 4.0 weight percent.

2. The method of claim 1 wherein the reaction is carried out in the presence of a liquid petroleum hydrocarbon fraction having a boiling point from about 160° to 250° C.

3. The method of claim 2 wherein the liquid hydrocarbon is a fraction selected from the group consisting of kerosene, naphtha, alkylate, ligroin, mineral spirits, tetralin, decalin, gasoline and mixtures thereof.

4. The method of claim 2 wherein the liquid hydrocarbon fraction is present as a diluent.

5. The method of claim 1 wherein prior to the addition of sodium-zinc alloy to the reaction zone, it is admixed with a liquid petroleum hydrocarbon fraction having a boiling point from about 160° to 250° C.

6. The method of claim 5 wherein the sodium-zinc alloy is in the form of a liquid hydrocarbon paste.

7. The method of claim 5 wherein the sodium-zinc alloy composition is suspended in said liquid hydrocarbon.

8. The method of claim 7 wherein said suspension contains a minor amount of a surface-active agent.

References Cited
UNITED STATES PATENTS

| | | | |
|---|---|---|---|
| 2,991,153 | 7/1961 | Robinson et al. | 23—116 |
| 3,205,038 | 9/1965 | Hansley et al. | 23—116 |
| 3,216,791 | 11/1965 | Hansley et al. | 23—116 |

E. C. THOMAS, Primary Examiner

U.S. Cl. X.R.

252—188